(12) United States Patent
Maki et al.

(10) Patent No.: US 7,617,455 B2
(45) Date of Patent: Nov. 10, 2009

(54) DEVICE SEARCH APPARATUS

(75) Inventors: Nobuhiko Maki, Tokyo (JP); Noboru Hamada, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 573 days.

(21) Appl. No.: 11/393,665

(22) Filed: Mar. 31, 2006

(65) Prior Publication Data

US 2006/0170967 A1 Aug. 3, 2006

Related U.S. Application Data

(62) Division of application No. 09/570,407, filed on May 12, 2000, now abandoned.

(30) Foreign Application Priority Data

May 13, 1999 (JP) ................................. 11-132693
May 31, 1999 (JP) ................................. 11-151907

(51) Int. Cl.
*G06F 15/177* (2006.01)
*G06F 17/30* (2006.01)
*G06F 3/12* (2006.01)

(52) U.S. Cl. ...................... 715/734; 715/737; 715/738; 707/3; 707/102; 358/1.13; 358/1.15

(58) Field of Classification Search ......... 715/734–741; 707/3–6, 100, 102; 358/1.13, 1, 15
See application file for complete search history.

(56) References Cited

U.S. PATENT DOCUMENTS

| 5,353,399 A | 10/1994 | Kuwamoto et al. .......... 345/736 |
| 5,471,399 A | 11/1995 | Tanaka et al. .................. 716/11 |
| 5,548,722 A | 8/1996 | Jalalian et al. ............ 395/200.1 |
| 5,796,951 A | 8/1998 | Hammer et al. ........ 395/200.53 |
| 5,819,273 A | 10/1998 | Vora et al. .................... 707/10 |
| 5,935,217 A | 8/1999 | Sakai et al. .................. 709/249 |
| 6,047,111 A | 4/2000 | Sugiura et al. ............. 358/1.15 |
| 6,182,225 B1 | 1/2001 | Hagiuda et al. ............... 726/19 |
| 6,198,542 B1 | 3/2001 | Tabata ........................ 358/1.15 |
| 6,348,971 B2 | 2/2002 | Owa et al. .................. 358/1.15 |
| 6,369,909 B1 | 4/2002 | Shima ........................ 358/1.15 |
| 6,477,589 B1 | 11/2002 | Suzuki et al. ................. 710/18 |
| 6,618,163 B1 | 9/2003 | Roosen et al. ............. 358/1.15 |
| 2001/0052995 A1 | 12/2001 | Idehara ...................... 358/1.15 |
| 2003/0061322 A1 | 3/2003 | Igarashi et al. .............. 709/223 |
| 2003/0191842 A1 | 10/2003 | Murphy et al. .............. 709/226 |

FOREIGN PATENT DOCUMENTS

| EP | 0 614 151 | 9/1994 |
| EP | 0 772 318 | 5/1997 |
| EP | 0 878 935 | 11/1998 |
| JP | 10-315577 | 2/1998 |
| JP | 11-45261 | 2/1999 |

OTHER PUBLICATIONS

U.S. Appl. No. 60/076,048, filed Feb. 26, 1998.

*Primary Examiner*—Tadeese Hailu
(74) *Attorney, Agent, or Firm*—Fitzpatrick Cella Harper & Scinto

(57) ABSTRACT

There is disclosed an apparatus for searching a device on a network. A device search client links a search condition for searching the device with an icon to store the search condition. When a user designates the icon, the search condition linked with the icon and stored is inquired of a device search server to obtain the search result. Subsequently, the display form of the designated icon corresponding to the search condition is changed based on the obtained search result.

7 Claims, 20 Drawing Sheets

FIG. 3

DIRECTORY REGISTER INFORMATION 300

| DEVICE NAME 301 | NETWORK ADDRESS 302 | OBJECT CLASS 303 | DEVICE TYPE 304 | COLOR 305 | DOUBLE-SIDED PRINT 306 | STAPLE 307 |
|---|---|---|---|---|---|---|
| Mr. COLOR | 192.168.16.131 | printer | printer | 1 | 0 | 1 |
| SECOND FLOOR HIGH SPEED MACHINE | 192.168.16.132 | printer | MFP | 0 | 1 | 1 |
| DEVELOPMENT ROOM PRINTER | 192.168.16.155 | printer | printer | 0 | 0 | 1 |
| FIRST FLOOR PRINTER | 192.168.16.156 | printer | printer | 0 | 1 | 0 |
| SCAN | 192.168.16.32 | scanner | scanner | NA | NA | NA |
| ... | ... | ... | ... | ... | ... | ... |

FIG. 6

SEARCH RESULT

| CONDITION NAME | DEVICE NAME | NETWORK ADDRESS | DEVICE TYPE |
|---|---|---|---|
| C1 | Mr. COLOR | 192.168.16.131 | printer |
| C2 | SECOND FLOOR HIGH SPEED MACHINE | 192.168.16.132 | MFP |
| C3 | NULL | NULL | NULL |

C1 : objectclass=printerANDcolor
C2 : objectclass=printerANDdouble-sidedANDstaple
C3 : objectclass=printerANDcolorANDdouble-sidedANDstaple

FIG. 7

| SEARCH··· | NEW ADDITION··· | | |
|---|---|---|---|
| DEVICE | STATUS | DESCRIPTION | ADDRESS |
| [?] | UNKNOWN | COLOR | UNKNOWN |
| [?] | UNKNOWN | DOUBLE-SIDED, STAPLE | UNKNOWN |
| [?] | UNKNOWN | COLOR, DOUBLE-SIDED, STAPLE | UNKNOWN |

CONDITION TABLE

| CONDITION NAME | CONDITION FORMULA |
|---|---|
| C1 | (& (objectclass=printer) (color=1) |
| C2 | (& (objectclass=printer) (doubleSided=1) (staple=1)) |
| C3 | (& (objectclass=printer) (color=1) (doubleSided=1) (staple=1)) |

801 — CONDITION NAME
802 — CONDITION FORMULA

FIG. 12

| DEVICE | STATUS | DESCRIPTION | ADDRESS |
|---|---|---|---|
| Mr. COLOR | AVAILABLE | COLOR | 191.168.16.131 |
| SECOND FLOOR HIGH SPEED MACHINE | AVAILABLE | DOUBLE-SIDED, STAPLE | 191.168.16.132 |
| | NONE | COLOR, DOUBLE-SIDED, STAPLE | UNKNOWN |

SEARCH··· NEW ADDITION···

FIG. 13

| |
|---|
| DEVICE INFORMATION — 9999 |
| ... |
| INSTALL PROGRAM — 9998 |
| ... |
| NETWORK DEVICE CONTROL PROGRAM — 9997 |
| ... |

FIG. 15

DIRECTORY REGISTER
INFORMATION
1500

| DEVICE NAME 1501 | NETWORK ADDRESS 1502 | OBJECT CLASS 1503 | DEVICE TYPE 1504 | COLOR 1505 | DOUBLE-SIDED PRINT 1506 | STAPLE 1507 |
|---|---|---|---|---|---|---|
| Mr. COLOR | 192.168.16.131 | printer | printer | 1 | 0 | 1 |
| SECOND FLOOR HIGH SPEED MACHINE | 192.168.16.132 | printer | MFP | 0 | 1 | 1 |
| DEVELOPMENT ROOM PRINTER | 192.168.16.155 | printer | printer | 1 | 0 | 0 |
| FIRST FLOOR PRINTER | 192.168.16.156 | printer | printer | 1 | 1 | 0 |
| SCAN | 192.168.16.32 | scanner | scanner | NA | NA | NA |
| ... | ... | | | ... | ... | ... |

FIG. 16

| DEVICE | STATUS | DESCRIPTION | | ADDRESS |
|---|---|---|---|---|
| Mr. COLOR | AVAILABLE | COLOR | STAPLE | 191.168.16.131 |
| DEVELOPMENT ROOM PRINTER | AVAILABLE | COLOR | | 191.168.16.155 |
| FIRST FLOOR PRINTER | AVAILABLE | COLOR | DOUBLE-SIDED PRINT | 191.168.16.156 |

SEARCH··· NEW ADDITION··· STORE RESTRICTEDLY··· END···

FIG. 17

| CONDITION NAME | CONDITION FORMULA |
|---|---|
| C1 | (& (objectclass=printer) (color=1) |
| C4 | (& (objectclass=printer) (color=1) (staple=1)) |

FIG. 18

| DEVICE NAME | OBJECT CLASS | COLOR | DOUBLE-SIDED PRINT | STAPLE |
|---|---|---|---|---|
| Mr. COLOR | printer | 1 | 0 | 1 |
| DEVELOPMENT ROOM PRINTER | printer | 1 | 0 | 0 |
| FIRST FLOOR PRINTER | printer | 1 | 1 | 0 |

FIG. 19

| DEVICE NAME | OBJECT CLASS | COLOR | ADF | FLATBED | DOUBLE-SIDED SCAN |
|---|---|---|---|---|---|
| 1ST SCANNER | scanner | 1 | 0 | 1 | 0 |
| 2ND SCANNER | scanner | 1 | 1 | 1 | 0 |
| 3RD SCANNER | scanner | 1 | 1 | 0 | 1 |

FIG. 20

| DEVICE NAME | OBJECT CLASS | COLOR TRANSMISSION | MULTI LINE | RESULT NOTIFICATION | DOUBLE-SIDED TRANSMISSION |
|---|---|---|---|---|---|
| 1ST FAX | facsimile | 1 | 0 | 1 | 0 |
| 2ND FAX | facsimile | 1 | 1 | 1 | 0 |
| 3RD FAX | facsimile | 1 | 0 | 1 | 1 |

FIG. 21

| CONDITION NAME | CONDITION FORMULA |
|---|---|
| C5 | (& (objectclass=scanner) (color=1) |
| C6 | (& (objectclass=scanner) (color=1) (adf=1)) |

FIG. 22

| CONDITION NAME | CONDITION FORMULA |
|---|---|
| C7 | (& (objectclass=facsimile) (colortx=1) |
| C8 | (& (objectclass=facsimile) (colortx=1) (notification=1)) |

FIG. 23

| | DEVICE | STATUS | DESCRIPTION | ADDRESS |
|---|---|---|---|---|
| | SEARCH··· | NEW ADDITION··· | SET LOCATION··· | |
| CONDITION C2 | [?] | UNKNOWN | DOUBLE-SIDED, STAPLE | UNKNOWN |
| CONDITION C3 | [?] | UNKNOWN | COLOR, DOUBLE-SIDED, STAPLE | UNKNOWN |

FIG. 24

CONDITION TABLE

| CONDITION NAME | CONDITION FORMULA | LOCATION |
|---|---|---|
| C1 | (& (objectclass=printer) (color=1) | useLocation=outside |
| C2 | (& (objectclass=printer) (doubleSided=1) (staple=1)) | (I(useLocation=outside) (useLocation=office)) |
| C3 | (& (objectclass=printer) (color=1) (doubleSided=1) (staple=1)) | (useLocation=office)) |

FIG. 27

| | DEVICE | STATUS | DESCRIPTION | ADDRESS |
|---|---|---|---|---|
| | SEARCH··· | NEW ADDITION··· | SET LOCATION··· | |
| CONDITION C1 | ? | UNKNOWN | COLOR | UNKNOWN |
| CONDITION C2 | ? | UNKNOWN | DOUBLE-SIDED, STAPLE | UNKNOWN |
| CONDITION C3 | ? | UNKNOWN | COLOR, DOUBLE-SIDED, STAPLE | UNKNOWN |

PRINTER TABLE

| DEVICE NAME | NETWORK ADDRESS | DEVICE TYPE | COLOR | DOUBLE-SIDED | STAPLE |
|---|---|---|---|---|---|
| HIGH SPEED COLOR MACHINE | 192.9.200.50 | printer | 1 | 1 | 1 |
| Mr. COLOR | 192.168.16.131 | printer | 1 | 0 | 1 |
| SECOND FLOOR HIGH SPEED MACHINE | 192.168.16.132 | printer | 0 | 1 | 1 |

2901, 2902, 2903, 2904, 2905, 2906

DEVICE SEARCH APPARATUS

This application is a division of application Ser. No. 09/570,407, filed May 12, 2000 (abandoned).

BACKGROUND OF THE INVENTION

1. Field of the Invention

The present invention relates to a search apparatus of a device on a network.

2. Related Background Art

As a conventional method of efficiently finding and utilizing various resources (printer, server, scanner, and the like) on a network, a method called directory service has been provided. The directory service is a so-called telephone directory regarding the network to store various information. As a concrete example of a directory system, Lightweight Directory Access Protocol (LDAP) is exemplified. The definition of the LDAP is described in RFC 1777 issued by IETF. By using this directory service, for example, to search the device connected to the network, the device information (network address, and the like) which can be utilized on the network can be obtained.

In the above-described conventional example, however, for example, when a network printer is searched, during the searching, various attributes such as the presence/absence of a staple function or a double-sided print support have to be inputted for each searching.

Moreover, regarding the display of a search result, only a part of the device information is simply displayed in characters, and there is a problem that it cannot be seen at a glance whether a desired device is found or not.

Furthermore, depending on a network environment for use, or a search condition to be inputted, a plurality of devices are sometimes displayed as the search result. In this case, in order to restrict the result, the detailed search condition needs to be further added, and the input of the detailed search condition for each search imposes excessive burdens such as operation troubles and the requirement for detailed knowledge on the device to a user.

SUMMARY OF THE INVENTION

The present invention has been developed to solve the above-described problems, and an object thereof is to provide a device search apparatus which can reduce user's operation troubles during searching of a device on a network.

Another object of the present invention is to provide a device search apparatus which can display a search result in an intelligible form.

Further object of the present invention is to provide a device search apparatus which can utilize various information obtained by executing device search as logical device information.

To attain the above-described objects, there is provided a device search apparatus for storing a search condition for searching a device, displaying a symbol corresponding to the stored search condition on a display, responding to designation of the symbol by a user, using the stored search condition in accordance with the designated symbol to search the device, and obtaining a search result.

Moreover, the display form of the designated symbol on the display is changed in accordance with the obtained search result.

Other objects and characteristics of the present invention will be apparent from the following description and drawings.

BRIEF DESCRIPTION OF THE DRAWINGS

FIG. 3 is a diagram showing one example of device information owned by the device search server.

FIG. 6 is a diagram showing one example of a search result outputted by the device search server.

FIG. 7 is a diagram showing one example of the screen display of the device search client before device search.

FIG. 12 is a diagram showing one example of the screen display of the device search client after the device search.

FIG. 13 is a diagram showing a memory map in the memory medium of device search software of the present embodiment.

FIG. 15 is a diagram showing one example of the device information owned by the device search server of the second embodiment.

FIG. 16 is a diagram showing one example of the screen display of the device search client of the second embodiment.

FIG. 17 is a diagram showing the example of a search filter in the second embodiment.

FIG. 18 is a device attribute map in the second embodiment.

FIG. 19 is a device attribute map when a scanner is a search object in the second embodiment.

FIG. 20 is a device attribute map when a facsimile machine is a search object in the second embodiment.

FIG. 21 is a diagram showing one example of the search condition when the search object is a scanner.

FIG. 22 is a diagram showing one example of the search condition when the search object is a facsimile machine.

FIG. 23 is a diagram showing one example of the screen display of the device search client after restriction is executed by a location in a third embodiment.

FIG. 24 is a diagram showing one example of the search condition held by the device search client of the third embodiment.

FIG. 27 is a diagram showing one example of the screen display of the device search client after the restriction is executed by the location in the third embodiment.

FIG. 29 is a diagram showing one example of a logical printer table held by the device search client.

DESCRIPTION OF THE PREFERRED EMBODIMENTS

Embodiments of the present invention will be described hereinafter in detail with reference to the drawings.

First Embodiment

Figure 1:
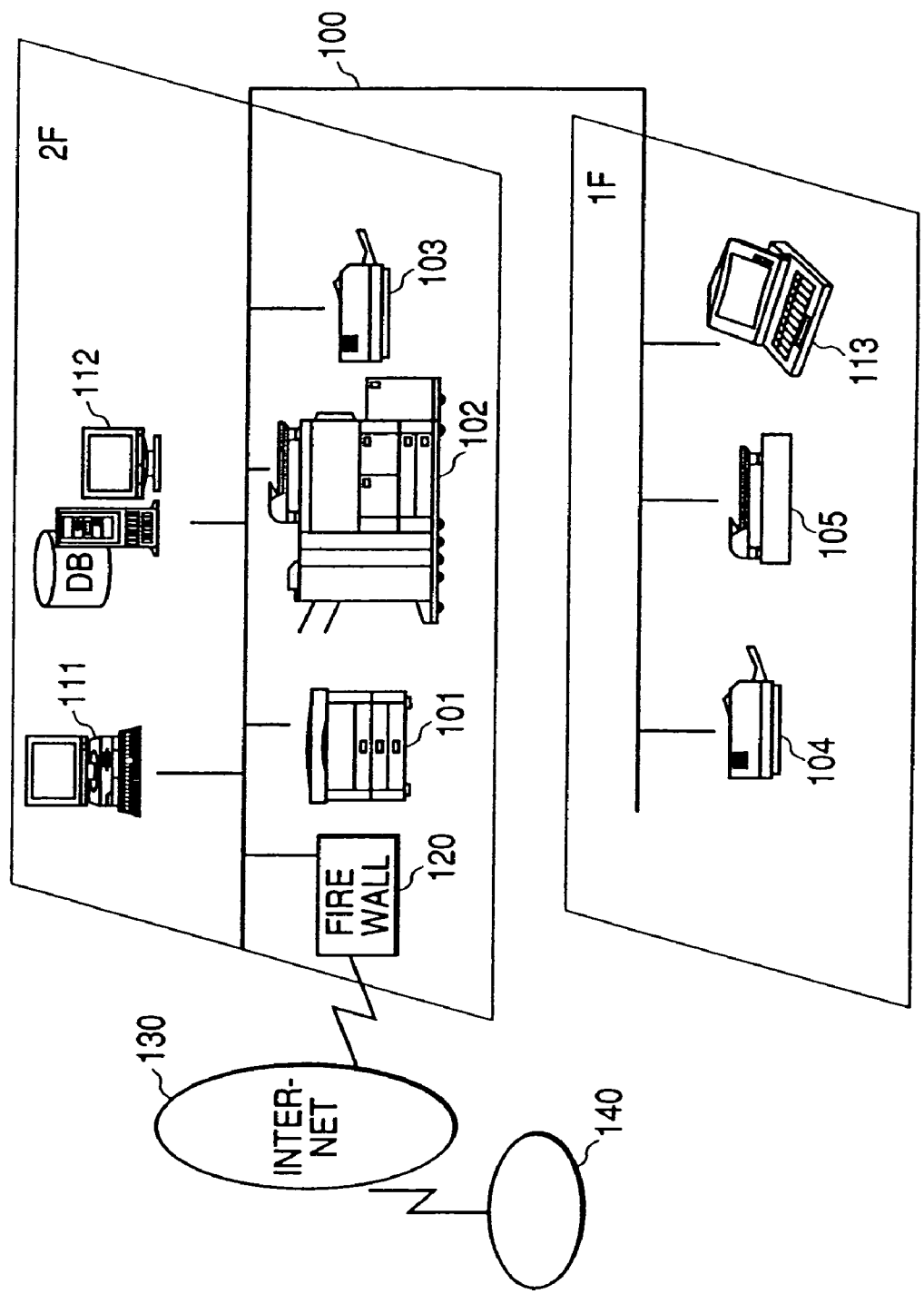
FIG. 1 is a diagram showing the constitution example of a network on which a device search system of the present embodiment can operate.

FIG. 1 is a diagram showing the constitution of the network on which the device search system of the present embodiment can operate. In FIG. 1, numeral 101 denotes a color printer, 102 denotes Multi Function Peripheral (MFP, a copying machine, but it can also be used as a network printer), 103 and 104 denote monochromatic printers, and 105 denotes a scanner connected to the network. Numerals 111 and 113 denote a desk top computer (hereinafter abbreviated as PC) and a note type computer (hereinafter abbreviated as note PC), respectively. These can execute the program of the device search client of the present embodiment, issue inquiry information on the device satisfying a desired condition to a device search server as described later, and display a search result. A PC 112, which can execute the program of the device search server of the present embodiment, stores the information (database) on the network devices 101, 105 as described later, accepts an inquiry for device search from the device search client 111 or 113, and returns the result. This PC 112 which can execute the program of the device search server will be hereinafter referred to as the device search server 112.

Among these devices, 101, 102, 103, 111, 112 and 120 are installed on a second floor, and 104 and 105 are installed on a first floor. The note PC 113 is now connected to LAN 100 from the first floor, but is removed in some cases because of its portable property. Furthermore, the network 100 for connecting these devices to one another is connected to Internet 130 via a fire wall 120, and also connected to another network 140 via Internet 130.

Figure 2:
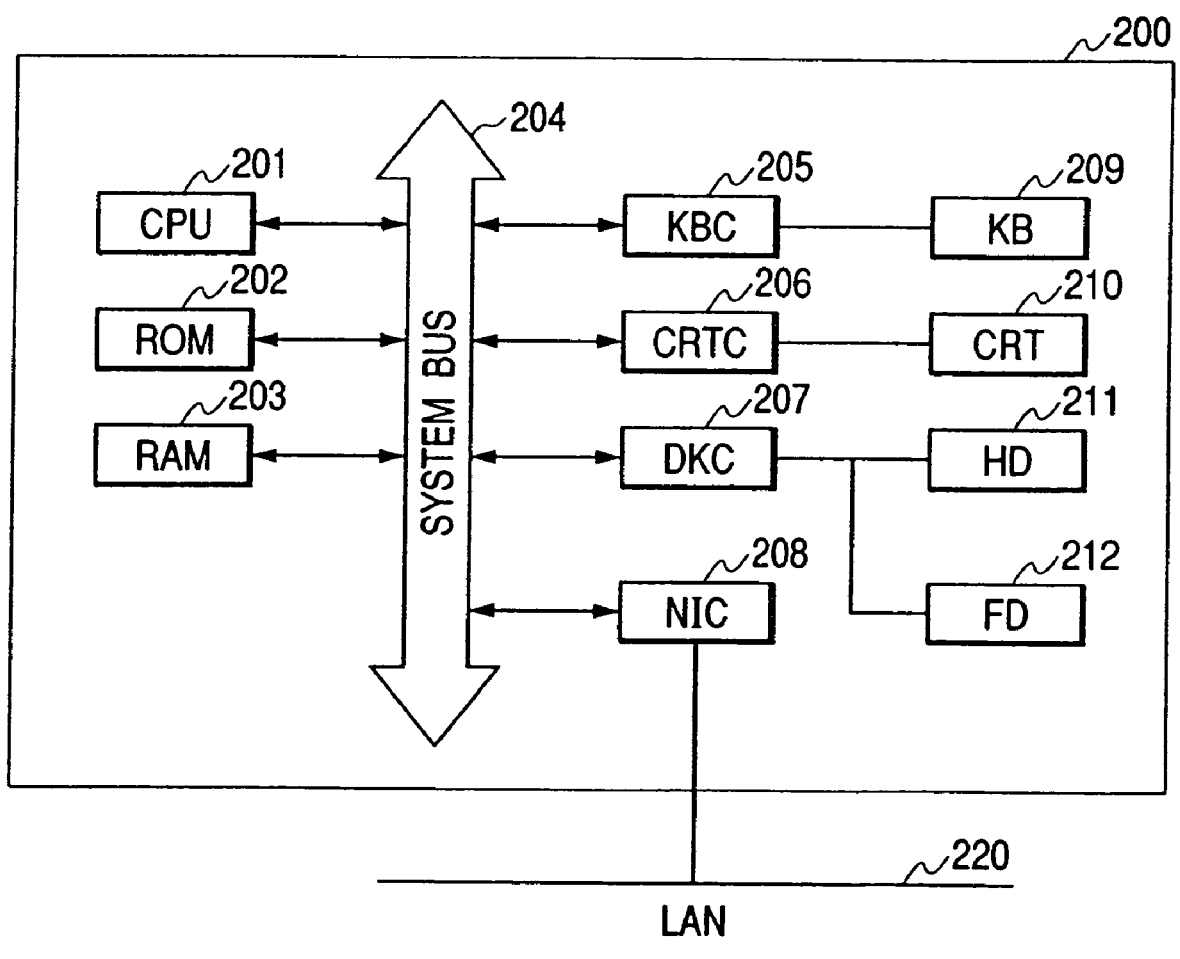
FIG. 2 is a block diagram showing one example of the constitution of a device search server and device search client.

FIG. 2 is a block diagram showing one example of the constitution of the search clients 111, 113 and the search server 112, and the constitution is similar to that of a general-purpose personal computer. In FIG. 2, numeral 200 denotes the entire PC in which device search client software and device search server software (hereinafter both referred to as the device search software) operate, and is equal to 111, 112 or 113 in FIG. 1. The PC 200 is provided with CPU 201 for executing the device search software stored in ROM 202 or a hard disk (HD) 211, or supplied from a floppy disk drive (FD) 212, and generally controls the respective devices connected to a system bus 204. A RAM 203 functions as a main memory, work area, and the like of the CPU 201. A keyboard controller (KBC) 205 controls instruction inputs from a keyboard (KB) 209, a pointing device (not shown), and the like. A CRT controller (CRTC) 206 controls the display of CRT display (CRT) 210. A disk controller (DKC) 207 controls the access to the hard disk (HD) 211 and the floppy disk controller (FD) 212 for storing a boot program, various applications, an edition file, a user file, a network management program, and the like. A network interface card (NIC) 208 bi-directionally exchanges data with the network printer, another network apparatus or another PC via LAN 220. Additionally, the LAN 220 is the same as the LAN 100 in FIG. 1.

The constitution and operation of the device search server will next be described. FIG. 3 is a diagram showing the structure of the database regarding the network apparatus stored in the search server 112 in a table form. In the search server 112, the information of database 300 is physically stored in the hard disk 211. In the table of FIG. 3, each line shows one device on the network. Respective columns show a device name 301, a printer network address 302, an object class 303 indicating the function type of the device, a device type 304, whether or not to support color print 305, whether or not to support double-sided print 306, and whether or not to support staple 307, respectively.

Here, the object class indicates the function type of the device. For example, when the device comprises a printer, a printer class is registered. Moreover, when a certain device has a print function, and even when the device is MFP, the device may be registered as a printer class device. On the other hand, the device type indicates the entire function of the device, and a single-unit printer is distinguished from the MFP here. In the notations 305 to 307, numeral 1 indicates supporting, and 0 indicates not-supporting. Moreover, NA denotes that no information regarding the attribute is stored.

For the data shown in FIG. 3, for example, the device registered in a first line of the table will concretely be described. It is seen that the device named Mr. Color is present in network address 192.168.16.131, the device has a print function, its form is a single-unit printer, the color print and staple are supported as the attribute, but the double-sided print function is not supported. In the present embodiment, suppose that the devices shown in first to fifth lines of FIG. 3 correspond to 101, 102, 103, 104 and 105 of FIG. 1, respectively. Additionally, the information shown in FIG. 3 is just an example, and needless to say, additional information such as an installation place may also be stored in the search server 112.

First Embodiment

A first embodiment will be described hereinafter.

Figure 4:
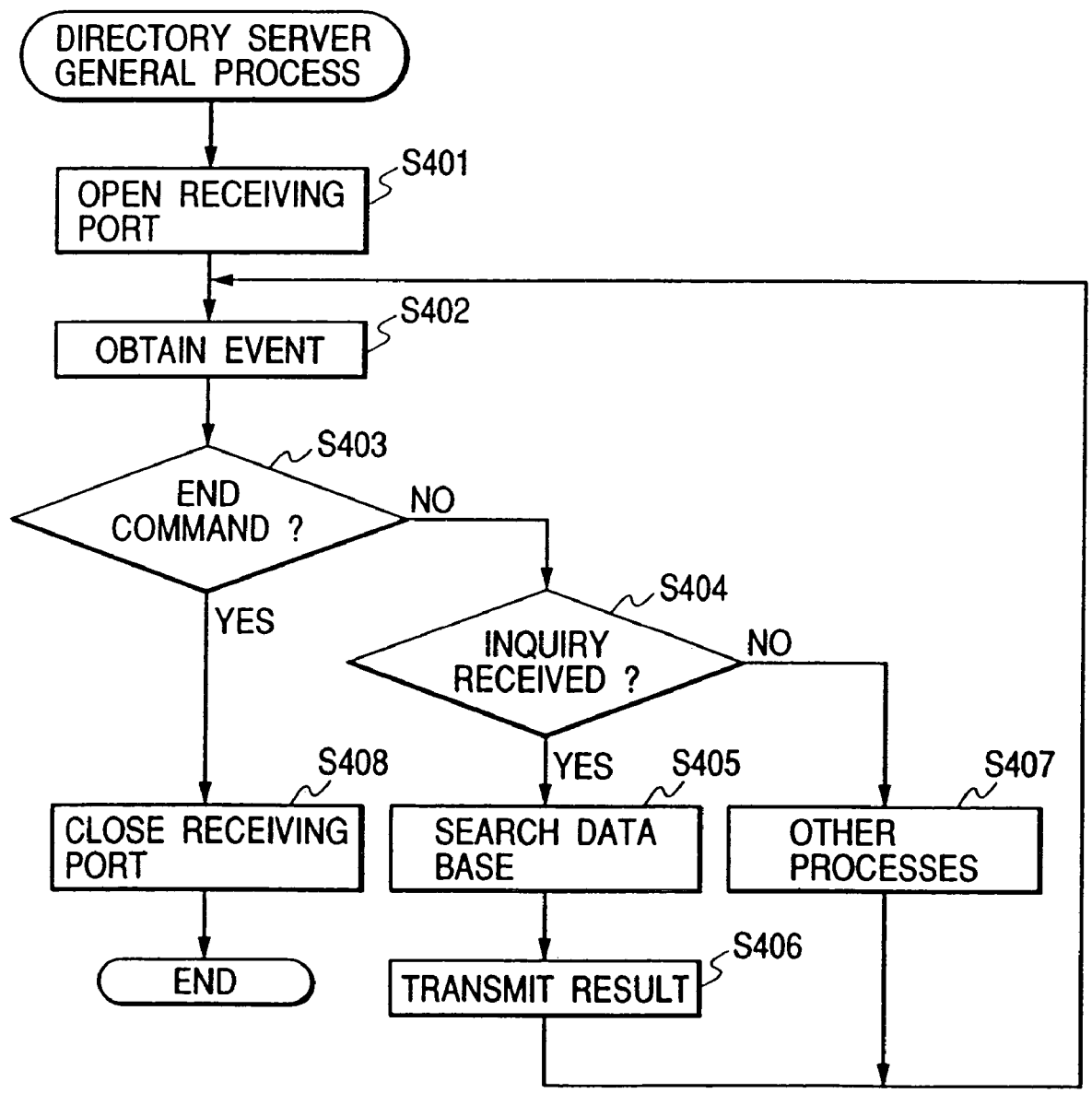
FIG. 4 is a flowchart showing the operation of the device search server.

First, the operation of the device search server 112 will be described with reference to the flowchart of FIG. 4 or FIG. 5. FIG. 4 is a flowchart showing the operation of the device search server 112. The judgment and execution of a series of processings are performed by the CPU 201 in the device search server in a hardware manner. When the device search server 112 starts, first in step S401, a receiving port for accepting a device search request from the device search client is opened. By this operation, when the search request is received from the device search client, an operating system issues a reception event, and notifies the reception of the search request to the program. The process then advances to step S402 to wait for the notification of some event from the operating system. When some event is notified, the process obtains the event and advances to the next step. It is judged in the next step S403 whether the event obtained in the step S402 is a system shutdown event by the user. In case of the shutdown event, after closing the receiving port in step S408, the program is ended. On the other hand, it is judged in the step S403 that there is no shutdown event, the process advances to step S404 to judge whether there is an inquiry reception event from the device search client. In case of the inquiry reception event, the process advances to step S405 to collate the database shown in FIG. 3 with an inquiry condition and select an appropriate device. In the subsequent step S406, the search result obtained in the step S405 is returned to the device search client. On the other hand, when it is judged in the step S404 that no inquiry reception event is received, the process advances to step S407 to perform processings other than the processing of the shutdown event or the inquiry reception event, such as screen update.

Figure 5:
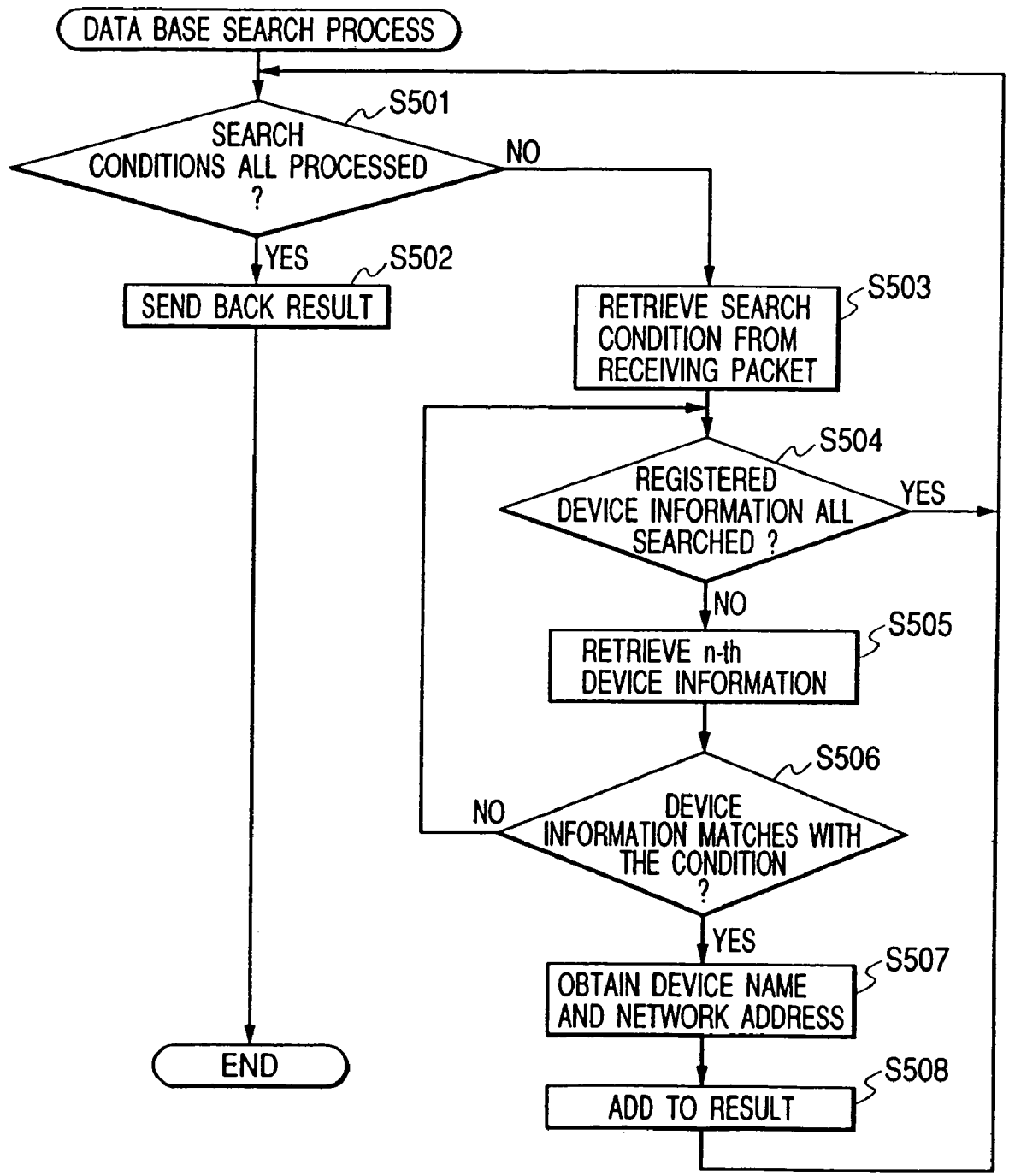
FIG. 5 is a flowchart showing a database search operation of the device search server.

FIG. 5 is a flowchart showing the database search operation of the step S405 in FIG. 4 in more detail. The entire process will briefly be described. In the database search step of the present embodiment, when the device search client designates a plurality of search conditions, a system of processing the search conditions one by one is employed. This is an outside loop which passes via NO judgment from step S501 and returns to the step S501. The inner loop passing via the NO judgment from step S504 and returning to the step S504 searches all registered information of the database for one search condition. Each step will be described hereinafter in detail.

In the database search operation, it is judged in the step S501 whether all the search conditions have been processed. If all the conditions are processed, the process advances to step S502 to send the search result back to a high-order program. On the other hand, when it is judged in the step S501 that all the search conditions have not been processed, the process advances to step S503 to retrieve one search condition from the information received from the device search client.

The process next advances to step S504 to judge whether all the databases 300 regarding the network devices shown in FIG. 3 have been searched. When it is judged that the search ends, the process returns to the step S501 to process the next search condition. On the other hand, when it is judged in the step S504 that the search of database 300 does not end, the process advances to step S505. In the step S505, the data for one device is retrieved from the database 300 of FIG. 3. It is judged in the subsequent step S506 whether the data retrieved in the step S505 matches with the search condition. If the data matches with the condition, the process advances to step S507.

On the other hand, when it is judged in the step S506 that the data retrieved in the step S505 does not match with the search condition, the process returns to the step S504 to continue the processing of the next device information registered in the database 300. In step S507, the device name 301, network address 302 and device type 304 are extracted from the information of the device which is judged to match with the search condition in the step S506, and added to the search result in the subsequent step S508. When the processing of the step S508 ends, with respect to the search condition being processed, the processing is ended, thereby returning to the step S501 to continue the processing of the next search condition.

For example, suppose that the device search client 111 or 113 requests to perform the device search on the following three search conditions with respect to the device having a print function.

Condition C1: color
Condition C2: double-sided and staple
Condition C3: color, double-sided and staple FIG. 6 shows the search result when the database shown in FIG. 3 is searched according to the algorithm shown in FIG. 5 based on the conditions. FIG. 6 shows that the device matching with the condition C1 is named Mr. Color, the network address is 192.168.16.131, and the device type is a single-unit printer. Similarly, it is shown that the device matching with the condition C2 is named a second floor high speed machine, the network address is 192.168.16.132, and the device type is an MFP. Since the device matching with the condition C3 is not found, this is shown by value NULL indicating that there is no corresponding device.

The operation of the device search client 111 and 113 will next be described. FIG. 7 shows one example of the screen display in the device search client before the device search is performed. A window 700 shows various information. Numeral 701 denotes a search menu. When the user selects the search menu 701 with the keyboard 209 or the pointing device (not shown), it is inquired of the device search server whether there is a device matching with the condition.

When the user selects a new addition menu 702, a dialog (not shown) is displayed, and the user inputs a desired search condition there. Upon inputting the search condition, a new device icon corresponding to the search condition is generated, and displayed in a column 703. In this example, three search conditions of condition C1 "color print", condition C2 "double-sided print, and staple", and condition C3 "color print, double-sided print, and staple" are inputted, and the icons are accordingly displayed as a result. All the displayed icons in the form of printers show that the search condition is designated to search the object class of the printer. If it is designated to search the object class of the scanner, the column 703 displays the icon having a scanner shape. Moreover, a question mark displayed on the icon indicates that it is still unknown whether the device matching with the condition is present or not. Numeral 704 denotes a column indicating a device status. It is also indicated here that it is still unknown whether the device matching with the condition exists or not at present. A column 705 shows the information on a device attribute in the search condition. A column 706 shows that the address of the device matching with the condition is still unknown.

Figures 8, 10:
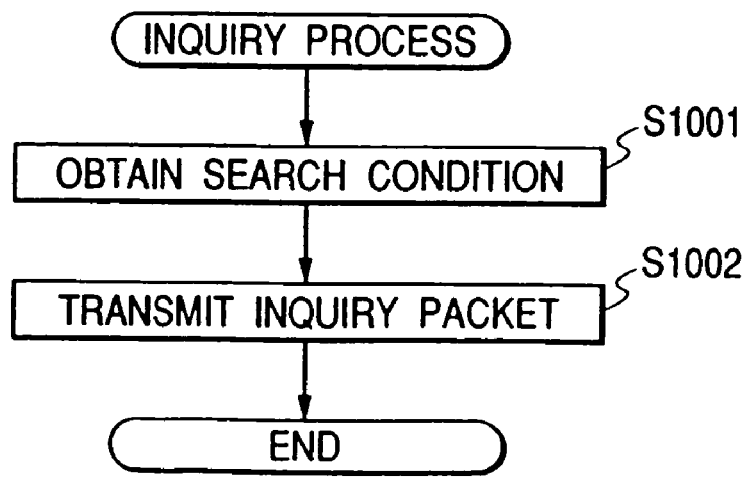
FIG. 8 is a diagram showing one example of a search condition held by the device search client.
FIG. 10 is a flowchart showing the search request operation of the device search client.

FIG. 8 is a diagram showing one example of the search condition data designated in the display screen of FIG. 7, and a notation method based on the definition of RFC 1960 issued by IETF is used in the present embodiment. In FIG. 8, numeral 801 denotes a search condition name, 802 denotes a search condition, and search conditions C1, C2 and C3 correspond to first, second and third lines of the search condition shown in FIG. 7. The search condition data inputted in the dialog (not shown) described with reference to FIG. 7 is stored in the hard disk 211 in the form shown in FIG. 8, and the stored search condition data can subsequently be used without inputting the search condition again.

Figure 9:
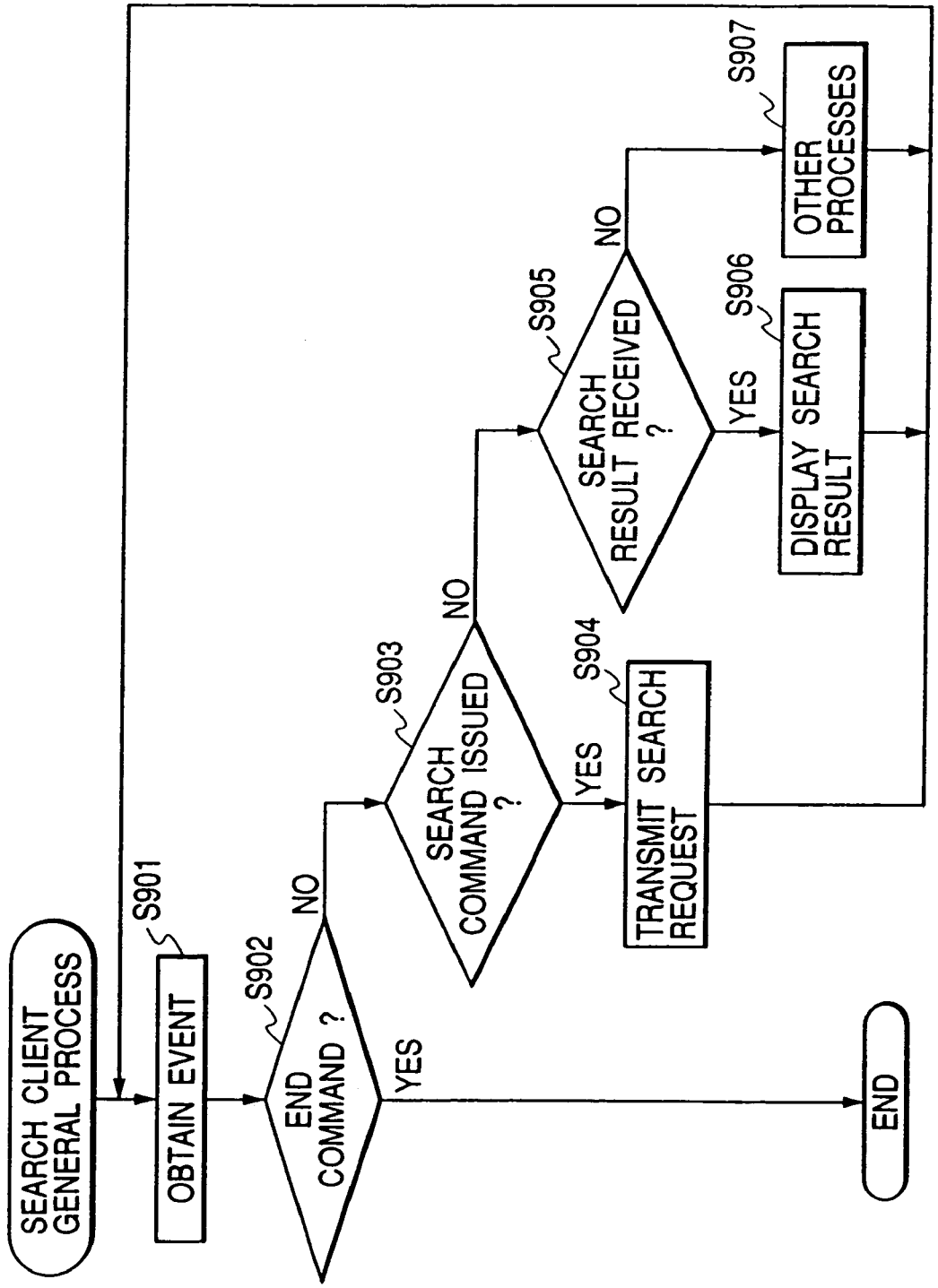
FIG. 9 is a flowchart showing the operation of the device search client.

FIG. 9 is a flowchart showing the operation of the device search clients 111 and 113. Additionally, the program of the device search client can be executed on the device search server 112. First, the outline of the operation of the device search client program will be described. The process waits for an event until the system ends, and operates as an event drive type program for performing an event processing on the occurrence of the event. A main event includes a system end event, device search request event, and device search result reception event. The individual steps will be described hereinafter in detail.

When the search client starts, first step S901 waits for the occurrence of an event. When the event occurs, the step obtains the event and advances to step S902. For the event obtained in the step S901, it is judged in the step S902 whether the user uses the keyboard 209 or the pointing device (not shown) to issue a system end command. If it is judged that the user issues the end command, the program ends. On the other hand, when it is judged in the step S902 that no end command event is issued, the process advances to step S903. It is judged in the step S903 whether the event obtained in the step S901 is obtained by the user's selecting the search menu 701 to issue a device search command. If the event is obtained by the issuance of the device search command, the process advances to step S904 to transmit a device search request to the device search server 112.

On the other hand, when it is judged in the step S903 that the event is not obtained by the issuance of the device search command, the process advances to step S905. It is judged in the step S905 whether the event obtained in the step S901 is obtained by receiving the response of the search result from the device search server 112 with respect to the transmission of the device search request in the step S904. If it is judged that the event is obtained by receiving the response, the process advances to step S906 to display the received search result in the window 700. When the processing of the step S906 ends, the process returns to the step S901 to wait for the next event. On the other hand, when it is judged in the step S905 that the event is not obtained by receiving the response, the process advances to step S907 to perform other processings. For example, the screen is re-drawn when the program starts or when the user moves the window of the screen. When the processing of the step S907 ends, the process returns to the step S901 to wait for the next event.

FIG. 10 is a flowchart showing the search request operation S904 of the flowchart of FIG. 9 in detail. First, step S1001 accesses the hard disk 211 to obtain the search condition data pre-stored as shown in FIG. 8. The subsequent step S1002 transmits the search condition to the device search server 112, and requests the search of the network device.

Additionally, for the address of the device search server, in the present embodiment, for example, the user writes the value inputted using the keyboard 209 onto the hard disk 211, and knows the address beforehand by reading or otherwise, but this is not limited. Another method may comprise a technique of a double space in a programming language Linda to obtain the address from the network.

Figure 11:
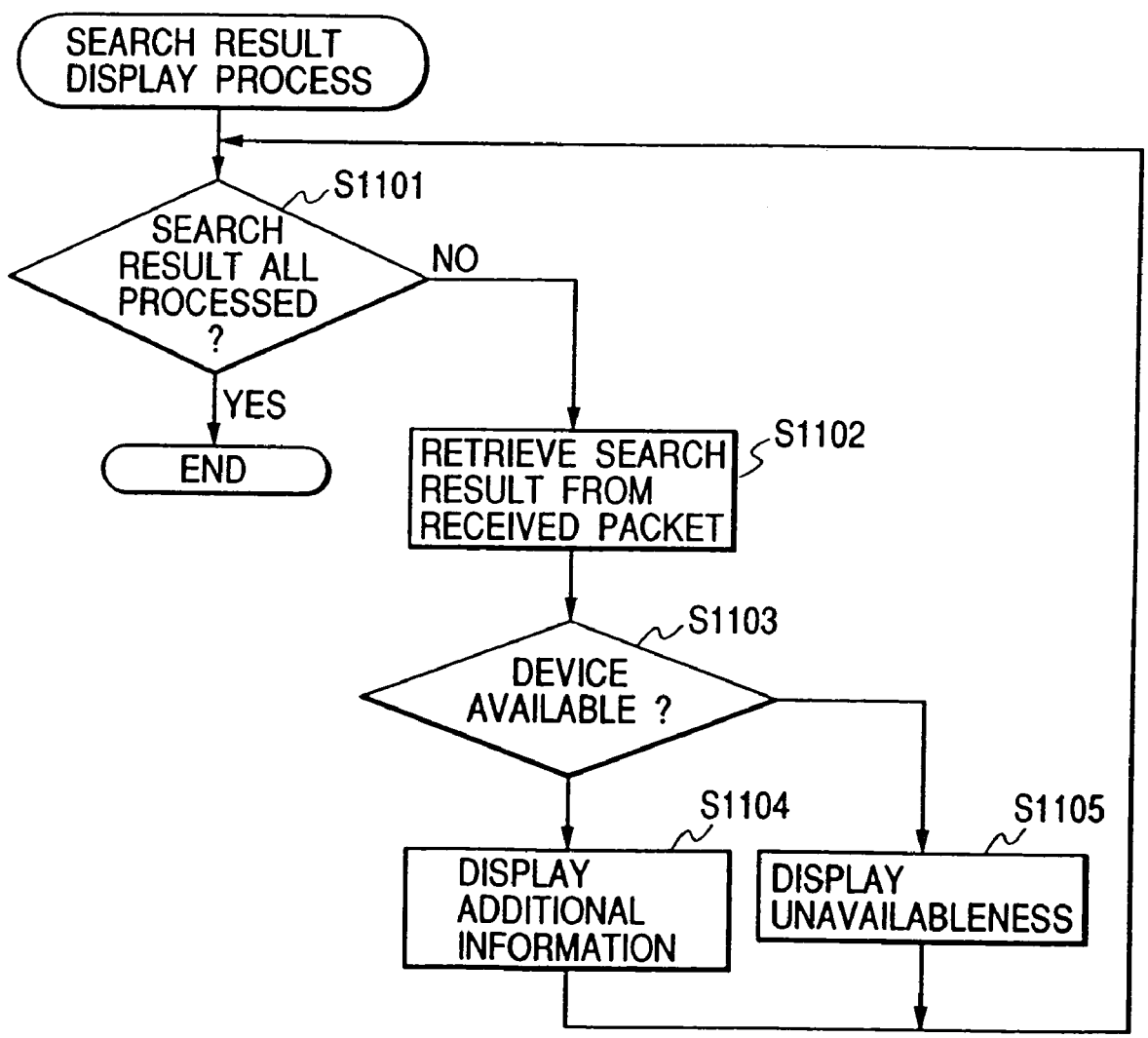
FIG. 11 is a flowchart showing the device search result display operation of the device search client.

FIG. 11 is a flowchart showing the search result receiving operation S906 in the flowchart of FIG. 9 in detail. Here, since the information on the respective devices matching with the plurality of search conditions C1 to C3 shown in FIG. 8 is returned from the search server 112, a display processing is performed on each piece of the information. First, it is judged in step S1101 whether or not all the received search results are processed. If the processing of all the results is completed, the program ends. On the other hand, when it is judged that all the search results are not processed, the process advances to the step S1102 to retrieve one received search result. In the subsequent step S1103, by checking the content of the search result retrieved in the step S1102 to judge whether the network address can be obtained, it is judged whether the device is available or not.

If the network address can be obtained, the device is judged to be available, and the process advances to step S1104. In the step S1104, additional information is displayed on the screen based on the obtained information. When the processing of the step S1104 ends, the process returns to the step S1101 to perform a processing of the next search result. On the other hand, when it is judged in the step S1103 that the device is not available, the process advances to step S1105 to display the device unavailability on the screen.

FIG. 12 is a diagram showing one example of the screen display of the device search clients 111 and 113 when the search operation ends. In comparison with the screen before the search operation described with reference to FIG. 7, when the devices (first Mr. Color, and second 2F high speed machine) matching with the respective search conditions are found, the device names and network addresses are displayed.

Moreover, for the device icon with the question mark attached thereto as shown in FIG. 7, the icon pattern is changed in accordance with the device type.

For example, since the type of the device corresponding to an icon 707 and matching with the condition C1 is a printer, the icon is changed to an icon 1201 of a printer pattern.

Moreover, since the type of the device corresponding to an icon 708 and matching with the condition C2 is an MFP, the icon is changed to an icon 1202 of an MFP pattern.

On the other hand, since the device corresponding to an icon 709 and matching with the condition C3 is nor found, the icon is changed to an icon 1203 provided with a cross mark.

As described above, according to the present embodiment, the trouble of the condition input during the searching of the device with the attribute desired by the user is eliminated, and the search result can be displayed in an intelligible manner.

Additionally, FIG. 12 shows the example of the search result display when one device is found for one search condition, but when a plurality of devices are found for one search condition, a plurality of device information are listed/displayed for one device icon.

The above-described network device control program of the present invention may be performed by the PC 200 in accordance with the program installed from the outside. In this case, the present invention is applied even when the program is supplied to the PC 200 by loading an information group including the program onto the PC 200 from an external memory medium by memory media such as CD-ROM, flash memory and floppy disk, or via the network of electronic mails or personal computer communication.

FIG. 13 shows one example of the memory map of the memory medium in which the program of the present embodiment is stored, and here the CD-ROM is presumed as the memory medium. Numeral 9999 denotes an area in which directory information is stored, and subsequently the positions of an area 9998 in which the install program is stored and an area 9997 in which the network device control program is stored are shown. Numeral 9998 denotes an area in which the install program is stored. Numeral 9997 denotes an area in which the network device control program is stored. When the network control program of the present invention is installed to the PC 200, first the install program stored in the area 9998 with the install program stored therein is loaded onto the system, and executed by the CPU 201. Subsequently, the install program executed by the CPU 201 reads the network device control program from the area 9997 with the network device control program stored therein, and stores the program into the hard disk 211.

In this manner, according to present embodiment, the trouble of the condition input during the searching of the device on the network is alleviated, and the search result can be displayed in an intelligible manner.

Second Embodiment

A second embodiment will next be described.

In the above-described first embodiment, the inputted search condition is related with the icon and stored, but in the present second embodiment, a search client will be described in which a search filter obtained by reflecting the search result in the inputted search condition is automatically generated, related with the icon and stored.

Also in the second embodiment, similarly to the first embodiment, the search client 111 in FIG. 1 transmits an inquiry packet with the search condition set therein to the search server 112 based on the operation shown in the flowchart of FIG. 9. The search server 112 searches the device matching with the search condition from the database based on the operation shown in the flowchart of FIG. 5, and returns the result to the search client 111.

Subsequently, the search client 111 displays the result received from the search server on the CRT 210 in the processing of the step S906 of FIG. 9. The processing of the step S906 in the second embodiment will be described hereinafter in detail.

Figure 14:
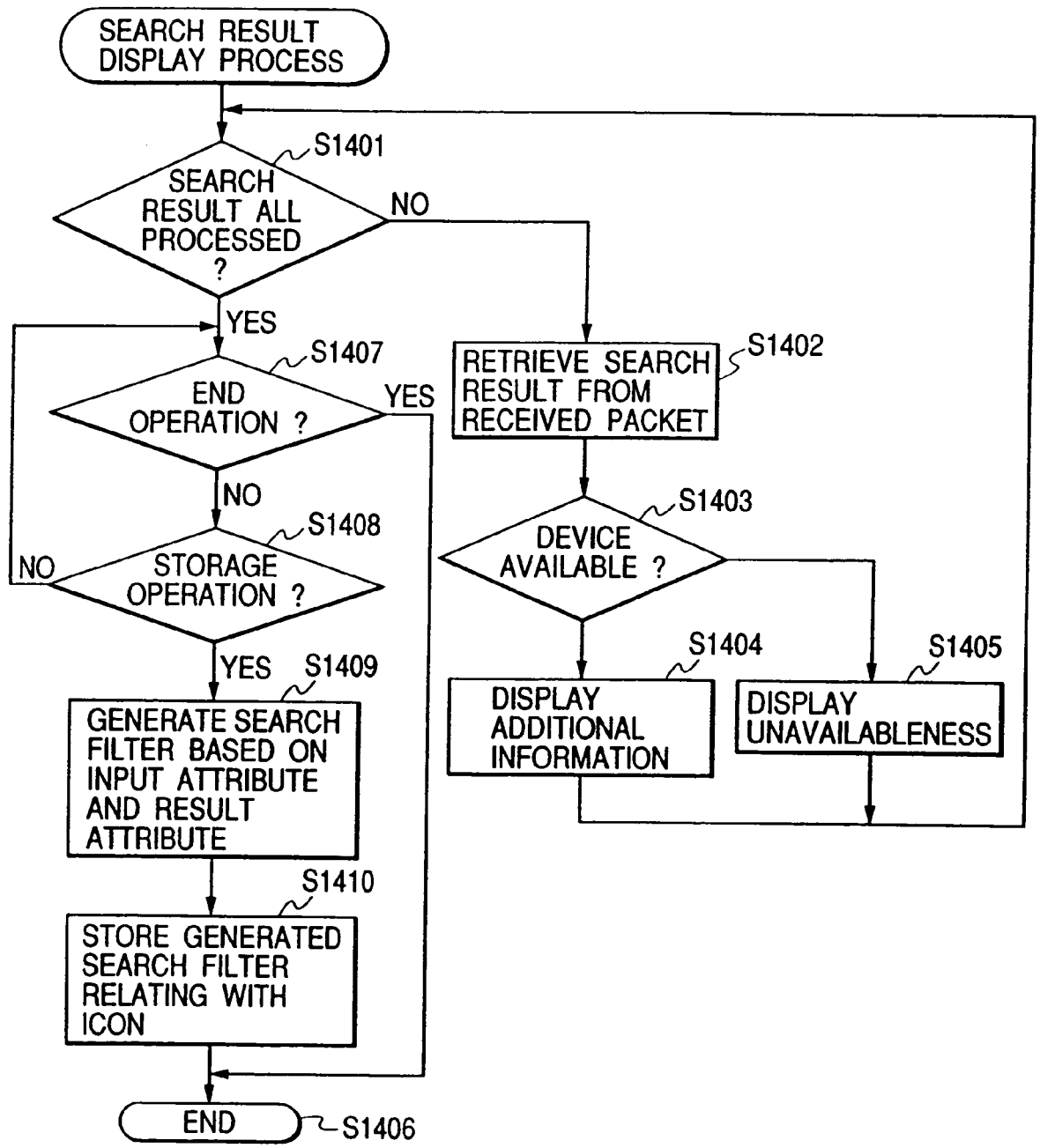
FIG. 14 is a flowchart showing the result display operation of the device search client according to a second embodiment.

FIG. 14 is a flowchart showing the search result display operation of the search client 111 of the second embodiment, and corresponds to the processing of the step S906 in the flowchart of the general operation of the search client 111 shown in FIG. 9 of the first embodiment. Moreover, FIG. 14 corresponds to the flowchart of FIG. 11 in the first embodiment.

In the description of each processing of the flowchart, a different part between the present second embodiment and the above-described first embodiment will be described.

First, it is supposed for the convenience of the description to obtain the search result from the search server 112 based on a database 1500 shown in FIG. 15. FIG. 15 is a diagram showing the structure of the database regarding the network apparatus stored in the search server 112 in the form of a table, and corresponds to FIG. 3 in the first embodiment. Additionally, for the description, the registration information shown in the example of FIG. 3 is partially changed. Concretely, "development room printer" and "first floor printer" are changed to provide a "color function", and further "development room printer" is changed to provide "no staple function".

Moreover, the screen of the search result in the second embodiment is displayed as shown in FIG. 16. FIG. 16 shows an example of the search result screen display in the second embodiment, and more specifically an example of the search result screen display when the printer having the color function (the same condition as the condition C1 in the first embodiment) is searched based on the database shown in FIG. 15. In the search result display of the second embodiment, further a restricted storage button 1607 and an end button 1608 are added to the search result display of FIG. 12 of the first embodiment.

The flowchart of FIG. 14 will be described hereinafter. In the loop processing which passes via the processing of step S1402 from the judgment processing of step S1401 and returns to the step S1401, the search result obtained from the device search server 112 is retrieved from the received packet and displayed on the window of the CRT 210. Since the processing operation is the same as the operation of the first embodiment, the description thereof is omitted.

When all the search results are processed in the step S1401, the search result window shown in FIG. 16 is displayed on the CRT 210.

It is judged in step S1407 whether the end operation is performed or not by the user. The end operation comprises clicking the end button 1608 with the pointing device (not shown) to end the screen display.

It is judged in step S1408 whether the storage operation is performed or not by the user. This storage operation comprises using the pointing device (not shown) to select one desired device from a plurality of devices whose results are displayed, and clicking the restricted storage button 1607 with the pointing device, and the like. After the storage operation is performed, the process advances to step S1409 to automatically generate the search filter for distinguishing the selected device from the other devices whose results are displayed. Specifically, by generating a device attribute map 1800 based on the search result received from the search server 112 as shown in FIG. 18, and comparing the attribute of the device selected by the user with the attributes of the other devices, the search filter in which only the selected device is obtained as the search result is generated.

For example, after the device "Mr. Color" is selected in the result display example of FIG. 16, and the restricted storage button 1608 is then clicked, in the device attribute map 1800, the attribute of the selected device "Mr. Color" 1801 is compared with the attributes of not-selected devices "development room printer" 1802 and "first floor printer" 1803, and "staple function" is extracted as a differentiating condition which characterizes "Mr. Color" 1801. Subsequently, a search filter C4 is generated from the differentiating condition and the search condition C1 during the inquiry to the search server 112.

FIG. 17 shows the condition C1 inquired of the search server 112 and the generated search filter C4. The generated search filter C4 is related with the predetermined icon, stored in the HD 211 (step S1410), and utilized in the subsequent process.

Moreover, the generated search filter C4 is overwritten and stored to the condition C1 inquired of the search server 112, and the icon corresponding to the condition C1 may be used as it is.

When the user essentially generates the search filter for restricting the device on the network, the detailed function of each device has to be known, but according to the second embodiment, the search filter for the restriction with a strict condition can be generated by a simple operation based on the device search result display executed on a moderate condition. Moreover, even when going outside, the user can search and utilize the desired device by the generated search filter.

In these days, the devices provided with inventive functions are successively placed on the market with technical innovation, and also the device on the network is frequently updated in many cases. Even in this case, according to the second embodiment, by first displaying the search result of the device executed on the moderate condition, and checking the actual device function on the display to perform a restriction processing, even the updated device function can securely be handled.

In the above-described second embodiment, by selecting one device from a plurality of devices whose search results are displayed, the search filter for the restriction is automatically generated, but the restricting condition may be adjusted by designating two or more devices. This will be described with reference to FIGS. 19 and 20.

FIG. 19 shows another embodiment of the device attribute map shown in FIG. 18, and a scanner is set as the device to be searched (object class=scanner). In the example of FIG. 19, the device attribute map is based on the result obtained by searching the scanner on the condition "with color read function", and "$1^{st}$ scanner" 1901, "$2^{nd}$ scanner" 1902, and "$3^{rd}$ scanner" 1903 are searched in the example. When the user selects the "$2^{nd}$ scanner" 1902 and "$3^{rd}$ scanner" 1903 by the pointing device and clicks the restricted storage button 1607, the search filter is generated on the condition "with color read function" 1904 and "with ADF function" 1905.

FIG. 21 shows the examples of condition C5 inquired of the search server 112 and generated search filter C6. Therefore, the user's intention of not imposing a condition of whether or not the type is flatbed (1906), or whether or not the screen read function is present (1907) can be reflected on the search filter.

Moreover, FIG. 20 shows another embodiment of the device attribute map shown in FIG. 18, and a facsimile machine is set as the device to be searched (object class=facsimile). In the example of FIG. 20, the device attribute map is based on the result obtained by searching the facsimile machine on the condition "with color transmission function", and "1$^{st}$ FAX" 2001, "2$^{nd}$ FAX" 2002, and "3$^{rd}$ FAX" 2003 are searched in the example. When the user selects the "2$^{nd}$ FAX" 2002 and "3$^{rd}$ FAX" 2003 by the pointing device and clicks the restricted storage button 1607, the search filter is generated on the condition "with color transmission function" 2004 and "with result notification function" 2006.

FIG. 22 shows the examples of condition C7 inquired of the search server 112 and generated search filter C8. Therefore, the user's intention of not imposing a condition of whether or not there is a multi line function (2006), or whether or not there is a double-sided transmission function (2007) can be reflected on the search filter.

Third Embodiment

In the above-described first embodiment, the inputted search condition is related with the icon and stored, but in the present third embodiment, a search client can restrict and display a plurality of prepared search conditions in accordance with the place where the user executes the search (hereinafter referred to also as the location). The search client will be described.

For example, when the user goes outside, the available device is unknown in many cases, and a relatively coarse search condition "color machine" has a meaning, but in an office situation where a large number of printers exist, during the search, a large number of printers are hit on the coarse search condition, and there occurs a problem that the search has no meaning.

Since the third embodiment realizes the search client for displaying the optimum search condition in accordance with the location where the user executes the search, the operability of the device search can remarkably be enhanced when the user moves the location together with a portable information terminal to perform the operation.

Figure 25:
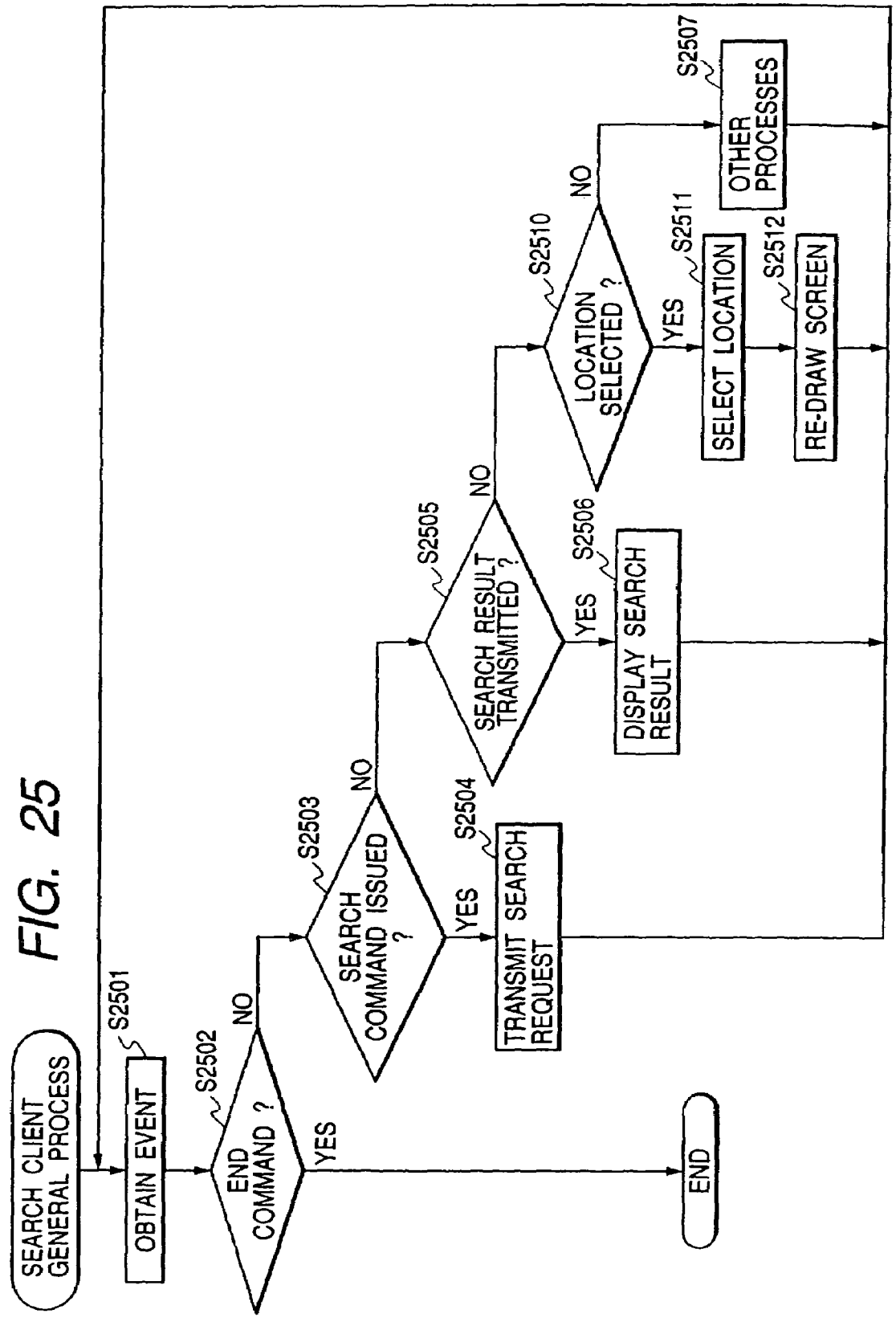
FIG. 25 is a flowchart showing the operation of the device search client of the third embodiment.

Also in the third embodiment, similarly to the above-described first embodiment, the search client 111 in FIG. 1 sets the search condition and transmits the inquiry packet to the search server 112 based on the operation shown in the flowchart of FIG. 25 as described later. The search server 112 searches the device matching with the search condition from the database based on the operation shown in the flowchart of FIG. 5, and returns the result to the search client 111.

Mainly the difference of the third embodiment from the first embodiment will be described hereinafter.

FIG. 27 is a diagram showing the state of the screen display before the search client executes the search operation in the third embodiment. FIG. 27 is substantially similar to FIG. 7 in the first embodiment, but different in that a location selection menu 2710 is newly added.

The location selection menu 2710 is an operation menu for setting the place where the user executes the search. When the user selects the location selection menu 2710, the dialog (not shown) is displayed, so that the location for executing the search operation and the address of the search server as the search inquiry object can be inputted as occasion demands. As the location information, for example, "office", "outside", and the like are set.

FIG. 24 shows that the search condition is related with the location information and stored. FIG. 24 is substantially similar to FIG. 8 in the first embodiment, but different in that information 2410 on the location to which the search condition is applied is added to each search condition.

In the example of FIG. 24, "outside" is set as the location condition to the condition C1, and "office" is set as the location condition to the condition C3. To the condition C2, "outside" and "office" are set as OR condition.

For the location conditions, the condition inputted from the keyboard 209, or the device location information obtained together with the device information from the execution result of the previous device search are stored.

The operation of the search client in the third embodiment will next be described with reference to the flowchart of FIG. 25. FIG. 25 is substantially similar to FIG. 9 in the first embodiment, but different in that a location selection judgment step S2510 and location selecting means 2511 are added.

When the user selects a location setting menu 2701, the judgment in step S2510 is Yes, and the process advances to step S2511. In the step S2511, the location condition selecting operation is executed. Specifically, the current location and search server address inputted by the user with the location setting menu of a search screen 2700 are recorded to the hard disk 211. Subsequently, in step S2512, the re-draw processing of the setting screen is performed, and the process returns to the step S2501.

Figure 26:
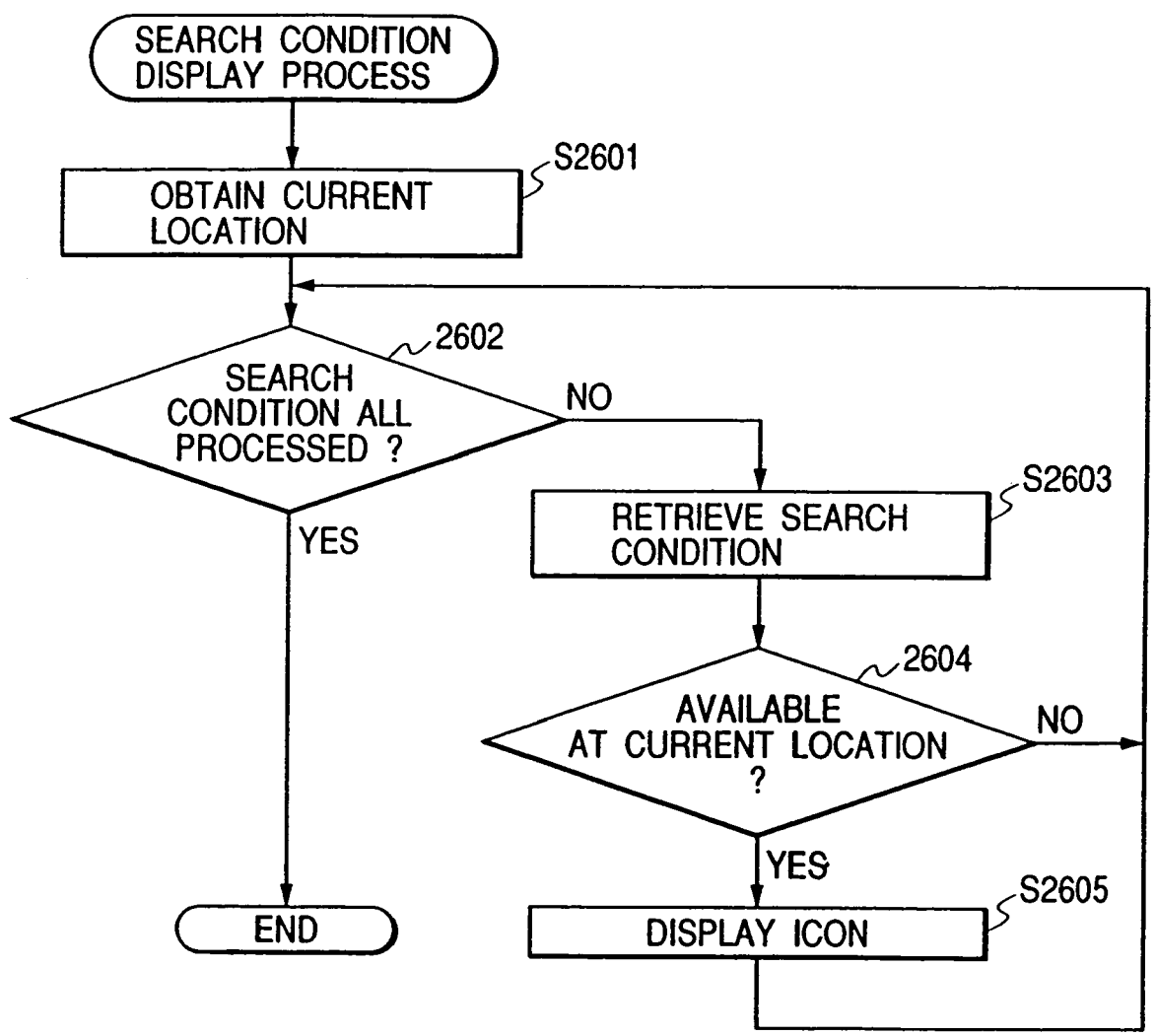
FIG. 26 is a flowchart of the screen re-draw operation of the device search client of the third embodiment.

FIG. 26 shows a flowchart of the detailed processing of the re-draw processing of the step S2512. Here, the search condition icon to be displayed in accordance with the current set location is restricted to re-draw the search screen.

First in step S2601 the hard disk 211 is accessed to obtain the current location set in the step S2511 and the address of the server as the search inquiry object.

It is judged in step S2602 whether all the search conditions shown in FIG. 24 are processed. When the processing is not ended, the process advances to step S2603 to obtain one of the search conditions (conditions C1 and C3) of FIG. 24.

The process advances to step S2604 to judge whether the current location obtained in the step S2601 matches with the location condition in the search condition obtained in the step S2603. When they match with each other, the process advances to step S2605 to display the icon indicating the search condition and the search condition information on the screen, and the process then flows to step S2602. When they do not match with each other, the process flows to step S2602 as it is.

After all the search conditions are processed in this manner, and it is judged in the step S2602 that all the search conditions are processed, the processing ends.

FIG. 23 shows one example of the search screen drawn by the re-draw processing. In the example of FIG. 23, the search screen shown in FIG. 27 is restricted by the location condition "office" and displayed. It is seen from FIG. 23 that among the conditions C1 to C3, since the condition C1 with the location condition "outside" does not satisfy the location condition "office", the search icon of the condition C1 disappears from the screen.

Here, the search icon which does not satisfy the location condition may be grayed out.

Moreover, the third embodiment is different from the operation in the first embodiment in another respect. This is the designation of the search server to be inquired of. In the inquiry packet transmission processing of the step S1002 of FIG. 10, as the transmission destination of the inquiry packet, the search server corresponding to the current location obtained in the step S2512 is designated.

In the third embodiment, the "office" and "outside" have been described as the examples of the location condition, but the application scope of the present invention is not necessarily limited to this. A plurality of office apparatuses are arranged, and "KKK print service" used in a company which presents services such as a document print may be used as the location.

In this manner, since the third embodiment realizes the search client for displaying the optimum search condition in accordance with the location where the user executes the search, the operability of the device search can remarkably be enhanced when the user moves the location together with the portable information terminal to perform the operation.

Fourth Embodiment

In a fourth embodiment, the device attribute data obtained from the search result is stored as a logical device.

Figure 28:
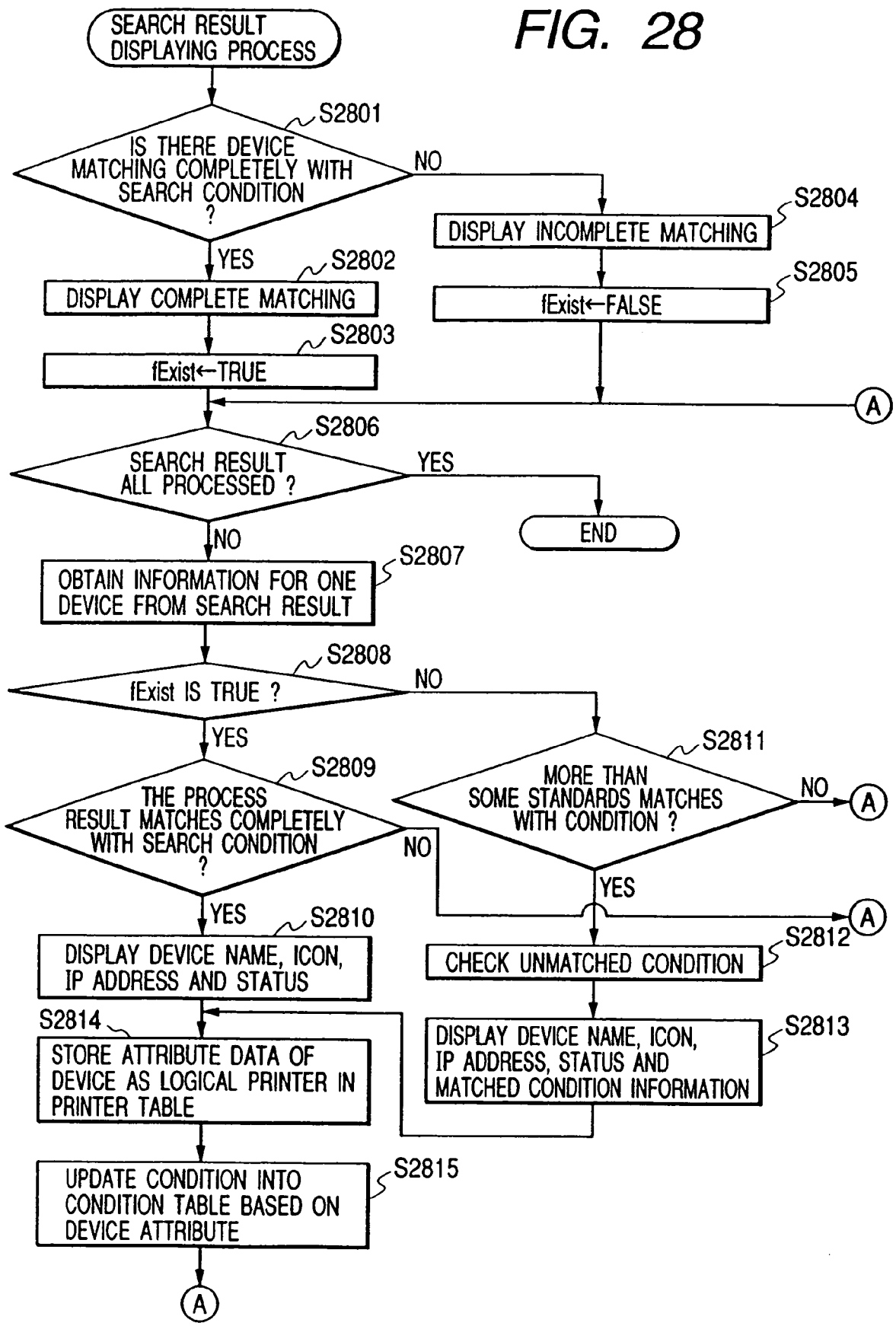
FIG. 28 is a flowchart showing the search result display operation of the device search client in a fourth embodiment.

FIG. 28 is a flowchart showing the search result display operation S906 in the flowchart of FIG. 9 in detail. In the search result display operation, in step S2801, the received search result is checked to judge whether there is a device matching completely with the search condition temporarily stored in the hard disk 211. When there is even one device matching completely with the condition, the process advances to step S2802. In the step S2802, the CRTC 206 is operated to rewrite the screen, and a dialog box (not shown) is displayed to display the complete matching. In the subsequent step S2803, in order to store the complete matching, TRUE is substituted for a temporary variable fExist indicating whether there is a complete matching or not. After ending the processing of the step S2803, the process advances to step S2806. On the other hand, when there is no device matching completely with the condition in the step S2801, the process advances to step S2804. The step S2804 operates the CRTC 206 to display the dialog box (not shown), and displays the incomplete matching. In the subsequent step S2805, in order to store the incomplete matching, FALSE is substituted for the temporary variable fExist. After ending the processing of the step S2805, the process flows to step S2806.

In a loop which passes via NO judgment from the step S2806 and returns to the step S2806, all device information included in the received search result (search result 600 shown in FIG. 6) are successively processed one by one (judgment of whether the search condition is satisfied or not, display, and the like). It is judged in step S2806 whether all the device information included in the received search result has been processed. When it is judged that all has been processed, the general process is ended. On the other hand, it is judged in the step S2806 that all the received information is not processed, the process advances to step S2807 to retrieve one piece of information from one or more pieces of the received device information. It is judged in the subsequent step S2808 whether the value of fExist Substituted in the step S2803 or S2805 is TRUE or FALSE to divide the processing. When fExist is TRUE, that is, when there is a device matching completely with the condition, the process advances to step S2809. Since some pieces of the received device information match incompletely with the search condition, only the device information matching completely with the condition is sorted out. This sorting is performed by step S2809. It is judged in the step S2809 whether the device information obtained in the step S2807 completely satisfies the search condition 802 stored in the hard disk 211. In case of incomplete matching, the process returns to the step S2806, and in case of complete matching, the process advances to step S2810. The step S2810 controls the CRTC 206 to rewrite the window 700, and displays the device information obtained from the search result. After ending the processing of the step S2810, the process advances to step S2814.

Additionally, a processing when fExist is FALSE in the step S2808 will be described hereinafter. When fExist is FALSE in the step S2808, the process advances to step S2811. In this case, the received search result includes the device which does not match with a search condition 801 at all except that the object classes match with each other, the device partially matching with the condition, and other various device information. It is preferable for the user to select and display only the important information from the information. The judgment is performed in the step S2811. Here, when the device matches two or more conditions among the designated three search conditions (color, double-sided, staple), that is, when the device matches with N-1 conditions among N conditions, it is judged that the device "more than some standards matches with the condition". Moreover, needless to say, the standards of the matching conditions, such as N-2 or N-3 conditions, may appropriately be set.

It is judged in the step S2811 whether the device information obtained in the step S2807 satisfies two or more attributes among three attributes (color, double-sided, staple) of the search condition 801 stored in the hard disk 211. If it is judged that two or more attributes are satisfied, the process advances to step S2812. The step S2812 checks unmatched attributes. In the subsequent step S2813, the CRTC 206 is controlled to update the screen, the device information is displayed together with the unmatched condition checked in the step S2812, and the process advances to step S2814. On the other hand, when it is judged in the step S2811 that two or more attributes are not satisfied, the process returns to the step S2806.

In the step S2814, the attribute data regarding the device subjected to the display processing in the step S2810 or S2813 is stored as the logical device data in the hard disk 211. This logical device data is stored in the form described later and shown in FIGS. 14 and 15. The logical device data is formed by storing the information on the device (IP address, driver information, and the like), and the user uses this logical device data to execute the device services such as printing. For example, this corresponds to the print cap file of UNIX™ operating system (printer managing file referred to when lpd program as a resident print program executes a print job) or the printer icon of operating system Windows 98™ of Microsoft Co., Ltd.

Thereafter, in step S2815, the search condition is extracted from the attribute data of the device being processed, and added as a new search condition to a search condition table when the same condition is not present in the search condition table in the hard disk 211. Additionally, when the same logical device data is already stored, no new storage is performed. When the processing of the step S2815 ends, the process returns to the step S2806.

FIG. 29 is a diagram showing a table in which the logical device data held by the search clients 111 and 113 is stored. This example shows the table (hereinafter referred to as the printer table) regarding the device whose object class is "printer", and the table is held in the hard disk 211 in the step S2814.

A device name 2901, network address 2902, device type 2903, and respective attributes 2904 to 2906 are held as a set of data. Here, for the value of each attribute data, "1" indicates that there is an attribute, and "0" indicates that there is no attribute.

For example, since the device name holds the device information "high speed color machine", the user can perform processings such as printing on the "high speed color machine" without performing any search.

Additionally, in this example, the logical device data of the device whose object class is "printer" has been described, but the tables of the logical device data of the devices whose object classes relate to other types such as "scanner" and "facsimile" can be generated/held individually. FIG. 16 shows the screen display example of the device search client after the search is executed and before a new search is executed. Two search conditions corresponding to the conditions C2 and C3 of the condition table shown in FIG. 13 are added, and the user's trouble of newly inputting the condition is saved.

In this manner, according to the present embodiment, by storing the attribute data of the device satisfying all the conditions designated by the user and the close device satisfying some of the conditions as the logical device, the device can subsequently be used without performing any search. Furthermore, even when the device satisfying all the conditions designated by the user is not found, by extracting and storing the search condition from the close device satisfying some of the conditions, the trouble of inputting the search condition can subsequently be saved.

Additionally, in the above-described embodiments, one apparatus of the printer, copy, facsimile, scanner, or the like has been exemplified as the device as the search object, but these apparatuses may also be applied to a united apparatus constituted of a plurality of apparatuses (e.g., a host computer connectable to the network, and interface apparatuses such as the scanner and printer locally connected to the host computer).

Moreover, it is needless to say that the object of the present invention is also achieved by providing the system or the apparatus with the memory medium in which the program code of the software to realize the functions of the above-described embodiments is stored, and reading and executing the program code stored in the memory medium by the computer (or CPU or MPU) of the system or the apparatus. The program code may be an MPU native code, a code described in a predetermined interpreter language and translated to the MPU native code during run time, and a code as the script data described in a predetermined form and interpreted/executed by the operating system.

In this case, the program code itself read from the memory medium realizes the inventive function of the present invention, and the memory medium in which the program code is stored constitutes the present invention.

Examples of the memory medium for supplying the program code include a floppy disk, hard disk, optical disk, magnetic optical disk, CD-ROM, CD-R, magnetic tape, non-volatile memory card, ROM, and the like.

The functions of the above-described embodiments are realized by executing the program code read by the computer. Additionally, when the OS or the like operating on the computer performs a part or the whole of the actual processing based on the instruction of the program code, the functions of the above-described embodiments can be realized by the processing.

Furthermore, after the program code read from the memory medium is written to the function expansion board inserted to the computer or the memory disposed in the function expansion unit connected to the computer, the CPU or the like disposed in the function expansion board or the function expansion unit performs a part or the whole of the actual processing based on the instruction of the program code, and the functions of the above-described embodiments can also be realized by the processing.

Additionally, it is needless to say that the present invention can also be applied when the program is distributed to a person who requires the program via the communication line of personal computer communication or the like from the memory medium in which the program code of the software for realizing the functions of the above-described embodiments is recorded.

As described above, according to first and seventh aspects of the present invention, even when the device search condition inputted by the user is stored, and no search condition is subsequently inputted again, by using the stored search condition data, the trouble of inputting the condition for every search is effectively alleviated.

Moreover, according to second and eighth aspects of the present invention, by displaying the network address of the device found as the search result, and accessing the device based on the network address, a desired service can be executed.

Furthermore, according to third and ninth aspects of the present invention, by changing the display element corresponding to the search condition to the display form based on the search result, the result can be displayed in an intelligible manner for the user.

Additionally, according to fourth and tenth aspects of the present invention, it can intelligibly be displayed that the device satisfying the search condition is found as the search result, and according to fifth and eleventh aspects of the present invention, it can intelligibly be displayed that the search condition cannot be satisfied as the search result.

Moreover, according to sixth and twelfth aspects of the present invention, by changing the icon indicative of the search condition to the pattern of the found device, the result is displayed so that the user can see the result at a glance.

Furthermore, according to a fourteenth aspect of the present invention, even when a plurality of devices are displayed as the search result, the search filter for the restriction can easily be generated, and the operational burden of the user's checking the detailed information on the device and adding each condition to generate the search filter is remarkably alleviated.

Additionally, according to a $23^{rd}$ aspect of the present invention, since the search client for displaying the optimum search condition is realized in accordance with the location where the user executes the search, the device search operability of the user who moves the location together with the portable information terminal to perform the operation can remarkably be enhanced.

what is claimed is:

1. An information processing apparatus comprising:
a storage operation input unit adapted to accept selection of a device by a user displayed in a list of devices on a display unit, and to accept the user's input to perform a storage operation for the selected device;
a search filter generating unit adapted to generate a new search condition as a search filter for the selected device, the new search condition being automatically generated in response to the acceptance of the user's input to perform the storage operation by comparing attributes of the selected device with other devices displayed by the display unit which were not selected by the user, extracting an attribute of the selected device which differentiates the selected device from the other devices, and generating the new search condition including the extracted attribute as the search filter; and
storing the generated new search condition in a storage unit for searching for the device selected by the user.

2. An information processing apparatus according to claim 1, further comprising a holding unit adapted to hold plural devices and corresponding attributes of each of the plural devices in association with each other, wherein said search filter generating unit extracts the attribute which has been associated with the selected device from said holding unit.

3. An information processing apparatus according to claim 2, wherein said search filter generating unit extracts from said holding unit the attribute which has been associated with the selected device and that is different from the other devices held in the holding unit, and automatically generates the new search condition including the extracted attribute as the search filter.

4. An information processing apparatus according to claim 1, wherein said storage operation input unit further accepts a selection of plural devices by the user displayed by the display unit, and said search filter generating unit further generates the new search condition by which the device having the attribute common to the plural devices selected by the user can be acquired as the search result.

5. An information processing apparatus according to claim 1, wherein the selected device is a print device, and the attribute is at least any one of presence/absence of a color print function, presence/absence of a double-sided print function, and presence/absence of a stapling function.

6. An information processing method implemented in an information processing apparatus, comprising:

a storage operation input step of accepting selection of a device by a user displayed in a list of devices on a display unit, and accepting the user's input to perform a storage operation for the selected device;

a search filter generating step of generating a new search condition as a search filter for the selected device, the new search condition being automatically generated in response to the acceptance of the user's input to perform the storage operation by comparing attributes of the selected device with other devices displayed by the display unit which were not selected by the user, extracting an attribute of the selected device which differentiates the selected device from the other devices, and generating the new search condition including the extracted attribute as the search filter; and a storage step of storing the generated new search condition for searching for the device selected by the user.

7. A computer-readable storage medium which stores a computer readable program to cause an information processing apparatus to execute:

a storage operation input step of accepting selection of a device by a user displayed in a list of devices on a display unit, and accepting the user's input to perform a storage operation for the selected device;

a search filter generating step of generating a new search condition as a search filter for the selected device, the new search condition being automatically generated in response to the acceptance of the user's input to perform the storage operation by comparing attributes of the selected device with other devices displayed by the display unit which were not selected by the user, extracting an attribute of the selected device which differentiates the selected device from the other devices, and generating the new search condition including the extracted attribute as the search filter; and a storage step of storing the generated new search condition for searching for the device selected by the user.

* * * * *